July 6, 1948.      W. R. WOOD ET AL      2,444,799
GENERATION SYSTEM
Filed Dec. 14, 1945
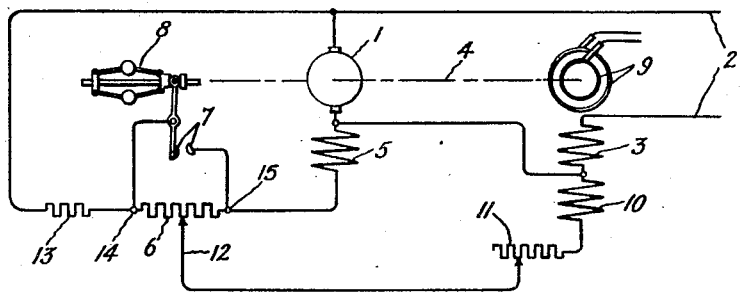
Inventors:
Winchester R. Wood,
Edgar E. Gaudet,
by Prowell S. Mack
Their Attorney.

Patented July 6, 1948

2,444,799

UNITED STATES PATENT OFFICE 2,444,799

GENERATION SYSTEM

Winchester R. Wood, Nahant, and Edgar E. Gaudet, West Lynn, Mass., assignors to General Electric Company, a corporation of New York Application December 14, 1945, Serial No. 634,995

5 Claims. (Cl. 322—16)

Our invention relates to generating systems and particularly to a motor-generator set provided with a regulating system for regulating the voltage of the generator.

An object of our invention is to provide an improved generating system utilizing a motor-generator set and a regulating system for the generator voltage.

Another object of our invention is to provide an improved motor-generator set with means for regulating the voltage of the generator.

Further objects and advantages of our invention will become apparent and our invention will be better understood from the following description referring to the accompanying drawing, and the features of novelty which characterize our invention will be pointed out with particularity in the claims annexed to and forming part of this specification.

In the drawing, we have schematically illustrated a generating system provided with an embodiment of our improved motor-generator set and regulating system.

Referring to the drawing, we have shown an embodiment of our invention in connection with a generating system provided with a motor-generator set including a direct current motor having an armature 1 connected across a source of direct current supply 2 through a series field exciting winding 3 of an alternating generator which is adapted to be driven through a mechanical coupling 4 by the motor armature 1. The motor is provided with a shunt field exciting winding 5 which is connected across the source of supply 2 through the generator field exciting winding 3 and through a series-connected fixed resistance 6. In order to control the speed of the motor 1, a speed responsive regulator is provided with contacts 7 connected across the fixed resistor 6 and adapted to short circuit the resistance 6 above a predetermined speed of the motor armature 1. This regulator may be operated by any suitable speed responsive device, such as a governor 8, which is driven at a speed responsive to the speed of the armature 1, so that if the armature 1 exceeds a predetermined desired speed, the contact 7 closes, short circuiting the resistor 6, thereby increasing the energization of the field exciting winding 5 and decreasing the speed of the motor. In order further to regulate the voltage of the generator across its armature winding connected to suitable current collector rings 9 and in order to eliminate or reduce hunting of this set, the regulating system includes a shunt field exciting winding 10 on the generator which is connected in shunt with the motor shunt field exciting winding 5 through a variable control resistance 11 and through an adjustable tap connector 12 which can include any desired amount of the fixed resistance 6 in the shunt circuit across which the generator field exciting winding 10 is connected. Both the motor shunt field exciting winding 5 and the generator shunt field exciting winding 10 are connected across the source of supply 2 through another fixed resistance 13 which forms part of the generator voltage regulating system. With this arrangement, the corrective or regulating effects of the generator field exciting winding 10 may be varied from a maximum boost to a maximum buck exciting component relative to the generator field exciting winding 3. Thus, if the contactor 12 is set to include all of the resistance 6 in shunt with the generator shunt field exciting winding 10 by being connected to the point 14, an overspeeding of the motor which closes the contacts 7 and short circuits the resistance 6 produces an increase in the current through the motor field exciting winding 5 and a consequent increase in the voltage drop through the resistor 13, which results in a lower voltage across the generator field exciting winding 10 to produce a further reduction in the voltage of the generator in addition to the reduction in this voltage due to the decrease in the speed of the motor and the speed of the rotatable member of the generator. Furthermore, if the movable contactor 12 connects all of the resistance 6 in series with the generator field exciting winding 10 by being connected to the point 15 of the resistance 6 and the motor armature 1 exceeds a predetermined desired speed, so that the contacts 7 of the regulator close and short circuit the resistance 6, the increase in the energizing current through the field exciting winding 5 is accompanied by a corresponding increase in the energizing current in the field exciting winding of the shunt field 10, thereby producing an increase in the generator voltage. Thus, it is possible to obtain both an increase and a decrease in the generator voltage by this regulating system with an increase in the motor speed above a predetermined value.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. A regulating system for a motor-generator set including a motor having a shunt connected field exciting winding and a fixed resistance connected in series with said motor field exciting winding, a second resistance connected in series with said motor shunt field exciting winding between said fixed resistance and said motor field exciting winding, means responsive to the speed of said motor for varying said second resistance, a generator, means for driving said generator by said motor, a main field exciting winding for said generator, a second field exciting winding for said generator connected in shunt with said motor shunt field exciting winding through an adjustable connection to said second resistance for regulating the voltage of said generator.

2. A motor-generator set including a motor having a shunt connected field exciting winding and a fixed resistance connected in series with said motor field exciting winding, a second resistance connected in series with said motor shunt field exciting winding between said fixed resistance and said motor field exciting winding, means responsive to the speed of said motor for short circuiting said second resistance when said motor reaches speeds above a predetermined speed to increase said motor field exciting winding energizing current, a generator, means for driving said generator by said motor, a field exciting winding for said generator connected in series with said motor, means including a second field exciting winding for said generator connected in shunt with said motor shunt field exciting winding through said second resistance for regulating the voltage of said generator.

3. A motor-generator set including a D.-C. motor having an armature and a shunt connected field exciting winding and a fixed resistance connected in series with said motor field exciting winding, a second resistance connected in series with said motor shunt field exciting winding between said fixed resistance and said motor field exciting winding, means including a centrifugally operated regulating contactor responsive to the speed of said motor for short-circuiting said second resistance above a predetermined speed, an alternating current generator, means for driving said generator by said motor, a field exciting winding for said generator connected in series with said motor armature, a second field exciting winding for said generator connected in shunt with said motor shunt field exciting winding through an adjustable connection to said second resistance for regulating the voltage of said generator.

4. A motor-generator set including a motor having an armature and a shunt connected field exciting winding, a fixed resistance connected in series with said motor field exciting winding, a second resistance connected in series with said motor shunt field exciting winding between said fixed resistance and said motor field exciting winding, means responsive to the speed of said motor for varying said second resistance inversely with the speed of said motor, a generator, means for driving said generator by said motor, means for exciting said generator responsive to current in said motor shunt connected field exciting winding, a second field exciting means for said generator connected in shunt with said motor shunt field exciting winding for including any desired amount of said resistance in circuit with said second generator field exciting means for regulating the voltage of said generator.

5. A motor-generator set including a D.-C. motor having an armature and a shunt connected field exciting winding and a fixed resistance connected in series with said motor field exciting winding, a second resistance connected in series with said motor shunt field exciting winding between said fixed resistance and said motor field exciting winding, means including a centrifugally operated regulating contactor responsive to the speed of said motor for short-circuiting said second resistance above a predetermined speed to increase said motor field exciting winding energizing current and to decrease the speed of said motor, an alternating current generator, means for driving said generator by said motor, a field exciting winding for said generator connected in series with said motor armature, a second field exciting winding for said generator connected in shunt wtih said motor shunt field exciting winding through an adjustable connection to said second resistance for including any desired amount of said resistance in circuit with said second generator field exciting winding for regulating the voltage of said generator.

WINCHESTER R. WOOD.
EDGAR E. GAUDET.

REFERENCES CITED

The following references are of record in the file of this patent:

UNITED STATES PATENTS

| Number | Name | Date |
|---|---|---|
| 966,475 | Saffell | Aug. 9, 1910 |
| 1,725,953 | Bethenod | Aug. 27, 1929 |
| 2,150,112 | Wolff | Mar. 7, 1939 |